June 30, 1931.  I. A. BABCOCK ET AL  1,812,461
HARROW
Filed April 25, 1928  2 Sheets-Sheet 2
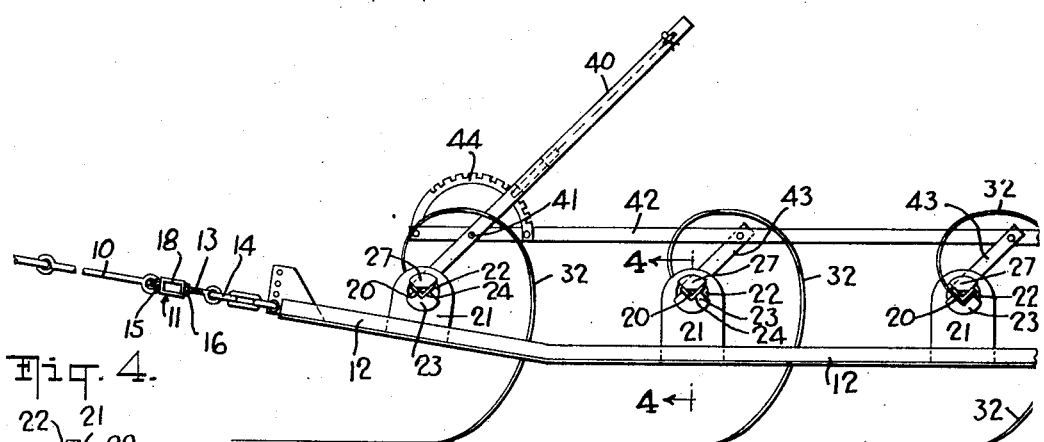
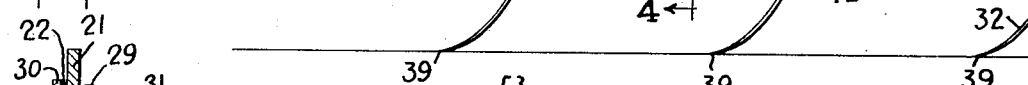
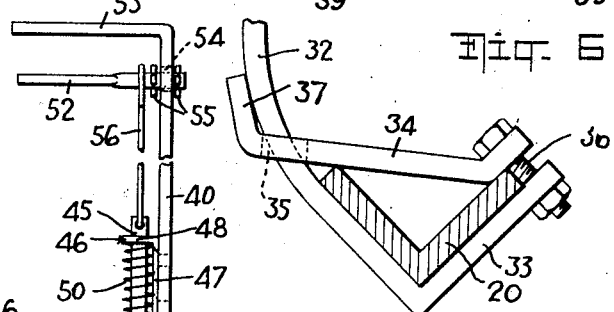
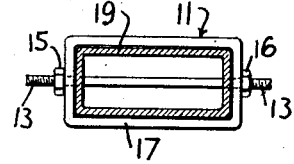
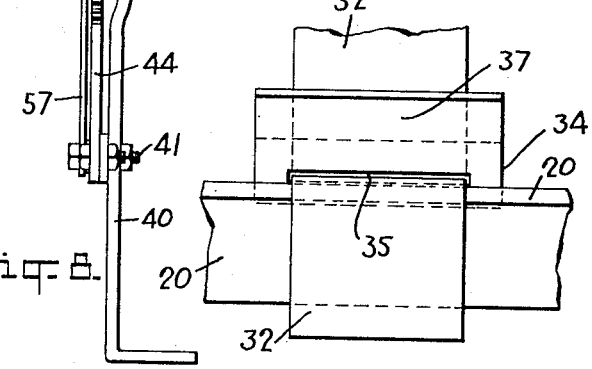
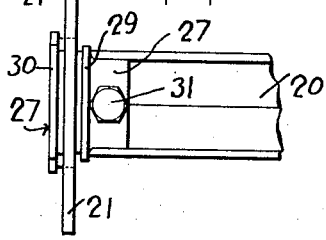
INVENTOR.
Isaac Allen Babcock
BY Arthur G. Reynolds
Mayer, Warfield & Watson
ATTORNEYS.

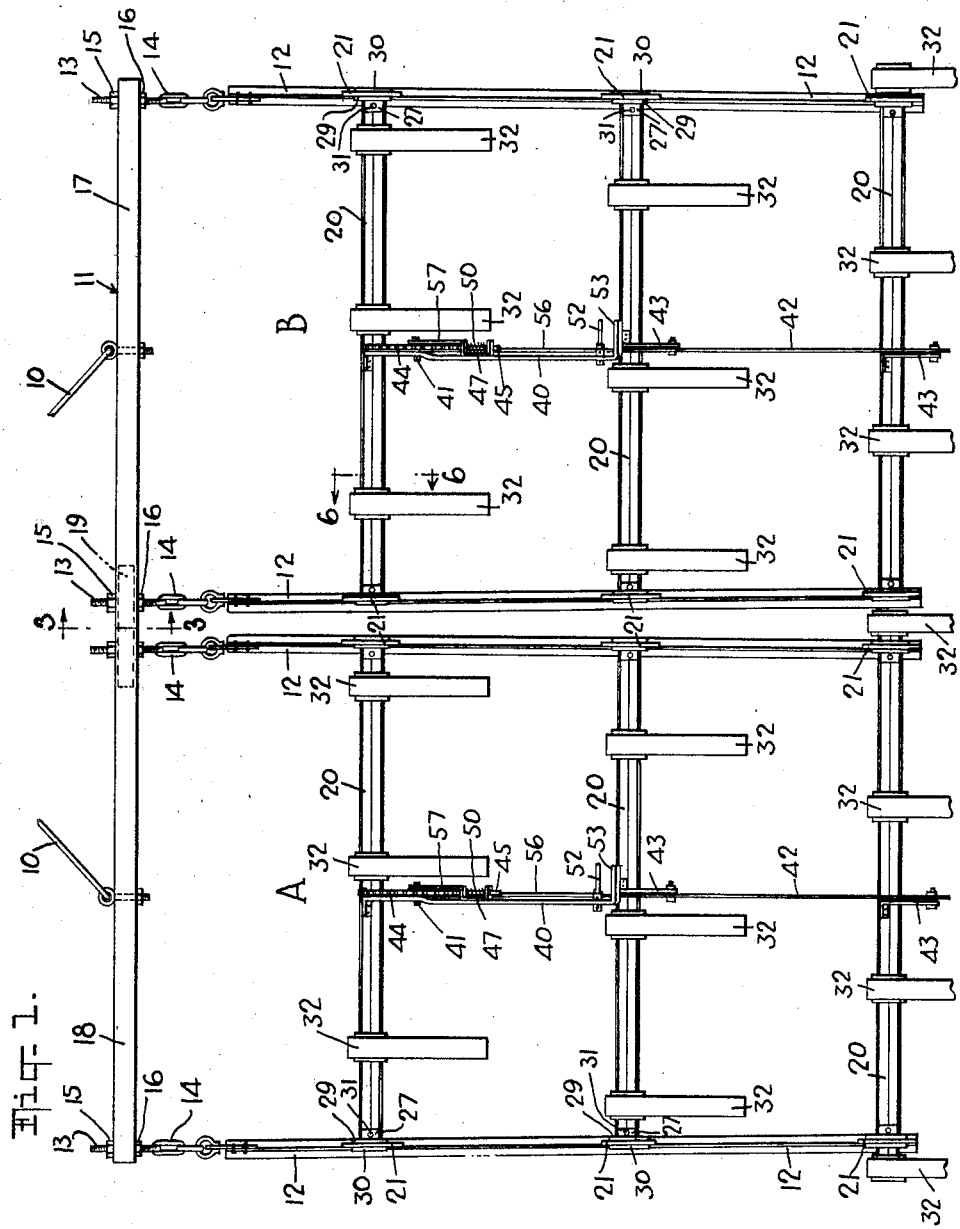

Patented June 30, 1931

1,812,461

UNITED STATES PATENT OFFICE

ISAAC ALLAN BABCOCK AND ARTHUR W. REYNOLDS, OF LEONARDSVILLE, NEW YORK, ASSIGNORS TO THE BABCOCK MANUFACTURING COMPANY, OF LEONARDSVILLE, NEW YORK, A CORPORATION OF NEW YORK

HARROW

Application filed April 25, 1928. Serial No. 272,585.

This invention relates to agricultural implements, such as harrows, cultivators, weeders and the like, and to correlated inventions and discoveries appertaining thereto.

An object of the invention is to provide an agricultural implement of the type described, which is simple and sturdy in construction, and which may be readily and economically manufactured and assembled.

Another object is to provide a harrow or similar implement which will adjust itself readily to unevenness of and obstructions in the ground over which it passes.

Another object is to provide a harrow or similar implement in which the tendency to collect rubbish, brush or the like is reduced.

Another object is to provide an improved composite drawbar for multi-sectional agricultural implements of the class described.

Other objects of the invention will in part be obvious and will in part appear hereinafter.

The invention accordingly comprises an article of manufacture possessing the features, properties, and the relation of elements which will be exemplified in the article hereinafter described and the scope of the application of which will be indicated in the claims.

For a fuller understanding of the nature and objects of invention reference should be had to the following detailed description taken in connection with the accompanying drawing, in which:

Figure 1 is a top view of a harrow embodying the invention;

Fig. 2 is a side view thereof;

Fig. 3 is an enlarged section taken through the drawbar in the direction of the arrows along the line 3—3 in Fig. 1;

Fig. 4 is an enlarged sectional view taken in the direction of the arrows along the line 4—4 in Fig. 2, and showing the rock shaft bearing assembly;

Fig. 5 is a top view of the rock shaft bearing assembly;

Fig. 6 is a partly sectional end view taken in the direction of the arrows along the line 6—6 in Fig. 1, showing the means for mounting the teeth on the rock bar;

Fig. 7 is a top view thereof; and

Fig. 8 is a front view showing the holding mechanism associated with the rocking lever.

The invention is directed to improvements adapted for use in various types of agricultural implements, such, for example, as harrows, weeders, cultivators, etc., which implements will be referred to hereinafter by the general term "harrows or the like."

The invention is exemplified as embodied in a multi-sectional spring tooth harrow. In this embodiment the usual draft connections 10 are secured to a drawbar 11, and a plurality of rearwardly extending T-bars 12, a pair of which serve as side members for each harrow section, are attached to the drawbar by eye-bolts 13 and flexible connections 14. A pair of nuts 15 and 16 are provided on each of the bolts 13 in order to permit the relative adjustment of the side bars 12 with respect to the drawbar. As will be seen from Fig. 1, the exemplified harrow comprises two independent sections A and B, but it is to be understood that the invention contemplates the provision of a harrow or the like comprising any number of sections which may be desirable for use in a particular case.

With a view to the provision of a multi-sectional harrow or the like which may be manufactured, shipped and assembled with extreme ease and economy, wherein the sections of such a harrow may be used separately, if desired, and which will withstand the strains to which it is ordinarily subjected in use, the drawbar 11 consists, in the present instance, of a pair of rectangular tubular members 17 and 18 into the adjacent ends of which a tubular fitting 19 telescopes; so as to provide a plurality of telescoping drawbar sections; and the assembled drawbar is held together by the same bolts 13 whereby the contiguous side bars of adjacent harrow sections are held in place, one of these bolts extending through each of the drawbar members, and each of them extending through the connecting member 19 to provide a unitary longitudinally-extending rigid drawbar in front of the sections. This member may be solid instead of tubular, if desired.

In the exemplified construction the side bars 12 in each section of the harrow, are connected by a plurality of rotatable tooth-carrying cross-bars 20 which form the sole connecting means for the side bars and are so mounted as to permit relative vertical and longitudinal movements of the side bars when stress is applied to the teeth. In the present instance suitable brackets 21 are provided on each of the side bars for mounting the cross-bars. These brackets, which are preferably formed of sheet steel, may be secured to the side bars 12 in any suitable manner, but are preferably welded thereto; and each bracket is provided at 22 with a bearing-eye adapted to receive one end of a cross-bar 20. The cross-bars, or "rock shafts", as exemplified, have an angular conformation, although any other suitable type of bar, such, for example, as hollow tubes, may be used, and are held rotatably within the bearing eyes by means of lower bearing members 23 each formed with a notch 24 to receive the angle of the cross-bar and provided with flanges 25 and 26, and upper bearing members 27 each adapted to fit within the angle of the cross-bar and provided with flanges 29 and 30. Bolts 31 serve to hold the bearing members against the cross-bars. As exemplified, the extent of the bearing surface provided by each pair of bearing members is sufficiently less than the extent of the bearing surface at the outside of the respective bearing-eye, and the space between the pairs of flanges 25 and 26 and 29 and 30, respectively, is sufficiently greater than the width of each bracket, so as to permit the harrow sections to adapt themselves readily to unevenness of or obstructions in the ground, while at the same time the flanges extend a sufficient distance outwardly to prevent any substantial turning movements of the side bars on a longitudinal axis. It is to be noted, however, that the flanges 25 and 29 are not extended outwardly to such a distance as to prevent the insertion of the bearing members in the bearing-eye before the cross-bar is placed therebetween. By the exemplified construction vertical and lateral play of the bearing members is permitted while substantially angular movement of the brackets is prevented.

In the exemplified construction spring teeth 32 are provided on the cross-bars, being clamped thereto in such manner as to permit the same to be adjusted longitudinally of the cross-bars. For this purpose there may be employed some suitable means, such, for example, as the means of the type shown in the patent to Arthur W. Reynolds, No. 1,555,610. As will be seen from Fig. 6, the heel 33 of the tooth is shaped to conform with the angular cross-bar 20, and is adapted to extend somewhat beyond the upper rear edge of the same. A clamping plate 34, formed at 35 with a slot through which the tooth 32 extends, bridges the cross-bar and is fastened to the rear end of the tooth by means of a bolt 36. The opposite end 37 of the plate extends angularly along the outer surface of the tooth and contacts therewith toward its extremity. As exemplified the teeth 32 are so shaped that the points 39 thereof cut the ground in a substantially horizontal plane when the angle of the cross-bars points downwardly. A particularly desirable form of tooth is disclosed and claimed in the patent to Arthur W. Reynolds No. 1,784,613.

In order to rotate the cross-bars so as to permit the spring teeth to be swung between different positions, there is provided a lever 40 secured to one of the cross-bars and pivotally mounted, by means of a bolt 41, on a connecting bar 42 to which connecting arms 43 extending to the other cross-bars of the harrow section are pivotally connected. In order that the lever, and consequently the harrow teeth, may be held in any desired position, there is provided on the connecting bar 42 adjacent the lever, a segmental rack 44 and on the lever suitable cooperating means for holding the lever in any position to which it is swung. This means comprises a dog 45 held in a dog-holder 46 which comprises a vertical portion 47 secured to the lever and a pair of horizontal portions 48 and 49 through which the dog extends. A coil spring 50 presses against a cotter pin 51 on the dog and tends to thrust the same against the lever. In order to move the dog away from the rack, there is provided a tooth lifting arm 52 adapted to be gripped together with a horizontal arm 53 at the top of the lever. The arm 52 is held loosely in an opening 54 in the lever by means of cotter pins 55 and is connected with the dog by means of the connection 56. With a view to imparting additional rigidity to the assembly and to preventing the breaking or bending of the lever when subjected to lateral stress, the dog-holder comprises a reinforcing arm 57 extending downwardly along the side of the segment opposite to the lever and pivotally mounted on the connecting bar 42 by means of the bolt 41.

With a view to minimizing the tendency for rubbish, weeds and the like to collect between the sections of the harrow, the contiguous side bars 12 of the harrow sections are preferably spread slightly fanwise toward the rear so that the space between the side bars of adjacent sections increases as the distance from the drawbar increases, a spread of an inch or so being ordinarily sufficient for this purpose, although, if adjusting means for the side bars, such as the nuts 15 and 16, are provided, the spread of the harrow sections may be adjusted to any suitable degree which may be found necessary in use. In the present instance the length of the crossbars at the rear is made somewhat less than the length of the crossbars at the forward portion of each section so that the distance between the pair of sidebars in each section decreases as the distance from the drawbar increases.

From the foregoing, it will be seen that the present invention makes possible the provision of a harrow which is exceedingly simple in construction, economical of manufacture and assembly and sufficiently flexible to operate on all types of ground without undue resistance to the tractive force or undue strain on the harrow parts, and which at the same time is sufficiently strong so that it will not break even under conditions wherein the parts are subjected to unusual stress.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. In a harrow or the like, the combination of a drawbar, a pair of spaced side bars extending rearwardly therefrom, flexible means for connecting each side bar to said drawbar, brackets on said side bars, each of said brackets being formed with a bearing eye, and means at the rear of said drawbar for connecting said side bars; said means consisting of a plurality of tooth-carrying cross-bars the ends of which extend into said bearing eyes, and flanged bearing means fitting loosely within each bearing eye for rotatably holding said cross-bars in said bearing eyes, the flanges on said bearing means being spaced throughout their length from the sides of said brackets so as to loosely embrace the same.

2. In a harrow or the like, the combination of a drawbar, a pair of side bars, flexible connections between said drawbar and said side bars, a bracket extending upwardly from each of said side bars and formed with a bearing eye, a cross-bar adapted to be rotatably mounted in said bearing eyes, a tooth on said cross-bar, flanged bearing means for mounting the ends of said cross-bar in said bearing eyes and formed to provide a bearing surface having a periphery smaller than the size of said bearing eyes, said flanges being spaced throughout their length a distance greater than the width of said brackets at the bearing eye and extending outwardly from the bearing means a sufficient distance to prevent a substantial turning movement of the side bars on a longitudinal axis.

3. In a harrow or the like, the combination of means providing a frame, a pair of brackets extending upwardly from said frame, a tooth-carrying cross-bar extending between said brackets, each of said brackets being formed with a bearing eye adapted to receive one end of said cross-bar, flanged bearing members for mounting the ends of said cross-bar in said bearing eyes, said bearing members being formed with bearing surfaces the periphery of which is smaller than the inner periphery of said bearing eye and the flanges on said bearing members being spaced a distance greater than the width of the bracket at the bearing eye so as to permit longitudinal movement of the cross-bar and extending outwardly from the bearing members a sufficient distance to maintain said brackets in an approximately vertical position.

4. In a harrow or the like, the combination of a drawbar; a pair of side bars, flexible connections between said drawbar and said side bars, a bracket on each of said side bars, each of said brackets being formed of a single piece of sheet metal having a bearing eye cut therein, a tooth-carrying cross-bar extending between said brackets, flanged bearing members for mounting the ends of said cross-bar in said bearing eyes, said bearing members being formed to provide bearing surfaces the periphery of which is smaller than the size of said bearing eyes, and the flanges on said bearing members being spaced throughout their length a distance greater than the width of said bracket.

5. In a harrow, the combination of a pair of side bars, a bracket on each of said side bars formed with a bearing eye, an angle-bar adapted to extend between said bearing eyes, a tooth secured to said angle-bar, a bearing member formed with an annular groove adapted to rest on said bracket at the bottom of said bearing eye and with a notched portion adapted to receive the angular edge of said angle-bar, and a bearing member formed with a groove adapted to receive the upper edge of said bearing eye and formed with oblique lateral surfaces adapted to receive said angle-bar, the groove in each of said bearing members being sufficiently wider than the thickness of said bracket and being sufficiently deep to permit vertical and lateral play of said bearing members within said bearing eye while preventing substantial angular movements of said bracket.

6. In a harrow or the like, in combination, a drawbar, a plurality of independent sections each comprising a pair of side bars and means to connect the side bars in each section in such manner that the distance between the pair of side bars in each section decreases as the distance from the drawbar increases, means to connect said side bars to the last-mentioned drawbar, said connecting means being so arranged that the distance between the contiguous side bars of adjacent sections increases as the distance from the drawbar increases.

7. In a harrow or the like, the combination of a drawbar, a plurality of tooth-carry sections each comprising a pair of side bars, the distance between the pair of side bars in each section decreasing as the distance from the drawbar increases, and means adjustably to secure each of said side bars to said drawbar, said means being so adjusted that the distance between the contiguous side bars of adjacent sections increases as the distance from the drawbar increases.

8. In a harrow or the like, the combination of a plurality of sections, a drawbar member for each of said sections, said drawbar members being of equal length, a pair of side bars connected to each drawbar member, and means to connect said drawbar members to provide a unitary longitudinally-extending rigid drawbar in front of said sections.

9. In a harrow or the like, the combination of a drawbar comprising a plurality of tubular members, a tubular connecting member inserted in adjacent ends of said tubular members, a plurality of side bars, and means to connect said drawbar to said side bars, said means serving to unite the drawbar members and the tubular connecting member.

10. In a harrow or the like, the combination of a drawbar, a plurality of harrow sections each comprising a pair of side bars, said drawbar comprising a plurality of telescoping members, means flexibly to connect each of said side bars with said drawbar and to unite the members of said drawbar, means connecting the pair of side bars in each section, said means consisting of a plurality of rotatable cross-bars, and means to mount said cross-bars on the side bars in each section and to prevent substantial turning movement of said side bars on a longitudinal axis while permitting relatively longitudinal and vertical movement of the side bars, said cross-bars and said flexible connecting means being so arranged that the distance between the contiguous side bars of adjacent sections increases as the distance from the drawbar increases.

11. In a harrow or the like, the combination of a plurality of sections, a drawbar member for each of said sections, an element telescoping the adjacent ends of adjacent drawbar members, means to connect each section to its drawbar members, said means serving to unite said telescoping members with the drawbar members.

12. In a harrow or the like, the combination of a drawbar comprising a plurality of telescoping sections, a plurality of side bars, a bolt extending forwardly from each side bar and extending through a telescoped portion of said sections so as to hold the telescoped sections in place, and nuts to hold said bolts in position.

In testimony whereof we affix our signatures.

ISAAC ALLAN BABCOCK.
ARTHUR W. REYNOLDS.